US010075911B2

United States Patent
Aakvaag et al.

(10) Patent No.: US 10,075,911 B2
(45) Date of Patent: Sep. 11, 2018

(54) WIRELESS SENSOR NETWORKS

(75) Inventors: Niels Aakvaag, Oslo (NO); Knut Sandven, Oslo (NO)

(73) Assignee: GasSecure AS, Oslo (NO)

( * ) Notice: Subject to any disclaimer, the term of this patent is extended or adjusted under 35 U.S.C. 154(b) by 1137 days.

(21) Appl. No.: 14/128,788

(22) PCT Filed: Jun. 13, 2012

(86) PCT No.: PCT/GB2012/051330
§ 371 (c)(1),
(2), (4) Date: Apr. 8, 2014

(87) PCT Pub. No.: WO2012/175933
PCT Pub. Date: Dec. 27, 2012

(65) Prior Publication Data
US 2014/0232555 A1    Aug. 21, 2014

(30) Foreign Application Priority Data

Jun. 24, 2011 (GB) .................................. 1110757.0

(51) Int. Cl.
*G08B 21/00* (2006.01)
*H04W 52/02* (2009.01)
(Continued)

(52) U.S. Cl.
CPC ......... *H04W 52/0209* (2013.01); *H04W 4/38* (2018.02); *H04W 4/70* (2018.02); *H04W 84/18* (2013.01)

(58) Field of Classification Search
CPC ....... G01F 23/36; H04W 4/005; H04W 4/006; H04W 52/0209; H04W 84/18
(Continued)

(56) References Cited

U.S. PATENT DOCUMENTS 4,551,710 A * 11/1985 Troup .................. G08B 26/004
340/10.2
7,377,184 B1 * 5/2008 Schlachter ............... G01D 1/18
340/870.01
(Continued)

FOREIGN PATENT DOCUMENTS

CN         1777111 A    5/2006
CN       101110735 A    1/2008
(Continued)

OTHER PUBLICATIONS

Examination Report for corresponding Australian Application No. 2012273784 dated Jun. 3, 2016. (5 pages).
(Continued)

*Primary Examiner* — Ojiako Nwugo
(74) *Attorney, Agent, or Firm* — Carter, DeLuca, Farrell & Schmidt, LLP

(57) ABSTRACT

A wireless sensor network comprises at least one sensor unit which comprises a sensor for sensing a parameter and at least one interrogating node. The interrogating node is arranged to transmit an interrogation message periodically to said sensor unit and to receive a reply message from said sensor unit. The sensor unit is arranged to transmit said reply message after a predetermined deliberate delay unless the sensor unit determines that an alarm condition has been met, in which case the sensor unit is arranged to transmit said reply message before the end of the deliberate delay.

25 Claims, 2 Drawing Sheets

(51) Int. Cl.
*H04W 4/38* (2018.01)
*H04W 4/70* (2018.01)
*H04W 84/18* (2009.01)

(58) Field of Classification Search
USPC ............. 340/584, 870.1, 870.09; 250/358.1; 709/200
See application file for complete search history.

(56) References Cited

U.S. PATENT DOCUMENTS

| | | | |
|---|---|---|---|
| 7,406,401 | B2 | 7/2008 | Ota et al. |
| 7,660,860 | B2 | 2/2010 | Yoon et al. |
| 7,797,367 | B1* | 9/2010 | Gelvin .................... H04L 67/12 709/200 |
| 8,994,539 | B2* | 3/2015 | Grohman ........... G05B 23/0272 219/448.12 |
| 9,007,181 | B2 | 4/2015 | Alicot et al. |
| 2004/0102877 | A1* | 5/2004 | Kane ......................... B61L 3/12 701/19 |
| 2005/0078672 | A1 | 4/2005 | Caliskan et al. |
| 2007/0063833 | A1 | 3/2007 | Kates |
| 2007/0114422 | A1* | 5/2007 | Berkcan ................. B64D 43/00 250/358.1 |
| 2008/0259732 | A1* | 10/2008 | Booij ...................... G01S 15/74 367/127 |
| 2009/0201866 | A1 | 8/2009 | Watteyne et al. |
| 2009/0265140 | A1 | 10/2009 | Murias et al. |
| 2009/0322510 | A1 | 12/2009 | Berger |
| 2010/0102973 | A1 | 4/2010 | Grohman et al. |
| 2011/0268026 | A1* | 11/2011 | Ronneke ........... H04W 72/1242 370/328 |

FOREIGN PATENT DOCUMENTS

| | | |
|---|---|---|
| CN | 101425220 A | 5/2009 |
| CN | 101533547 A | 9/2009 |
| CN | 102792346 A | 11/2012 |
| GB | 2455711 A | 6/2009 |
| GB | 2455771 A | 6/2009 |
| WO | 2009024925 A2 | 2/2009 |
| WO | WO2009024925 A2 | 2/2009 |

OTHER PUBLICATIONS

Office Action for corresponding Russian Application No. 2014102283 dated Mar. 29, 2016. (9 pages).
International Search Report for corresponding International Application No. PCT/GB2012/051330 dated Sep. 14, 2012. (10 pages).
International Preliminary Report on Patentability, International Patent Application No. PCT/GB2012/051330, filed Dec. 24, 2013 (5 pages).
Akerberg et al., "Future research challenges in wireless sensor and actuator networks targeting industrial automation", Jul. 26, 2011, pp. 410-415, 2011 9th IEEE International Conference on Industial Informatics (INDIN), IEEE.
International Search Report on Patentability, International Patent Application No. PCT/GB2012/051330, filed Jun. 13, 2012 (10 pages).
Office Action for corresponding Chinese Application No. 201280031262.3 dated Dec. 1, 2016.
Chinese Office Action dated Jul. 18, 2017 in corresponding Chinese Patent Application No. 201280031262.3 together with English translation, 15 pages.

* cited by examiner

WIRELESS SENSOR NETWORKS

CROSS-REFERENCE TO RELATED APPLICATIONS

This application is a U.S. National Stage entry under 35 U.S.C. § 371 based on International Application No. PCT/GB2012/051330, filed on Jun. 13, 2012, which was published under PCT Article 21(2) and which claims priority to British Patent Application No. 1110757.0, filed on Jun. 24, 2011.

FIELD OF THE INVENTION

This invention relates to networks of distributed wireless remote sensor units, typically battery powered, which report data from different physical locations.

BACKGROUND OF THE INVENTION

Such remote sensor networks are well known and used in a variety of different applications—e.g. for reporting temperature, pressure etc. They offer a way of obtaining data from a large number of different places which can then be centrally recorded, analysed and used in control systems.

In many applications the purpose of remote sensor networks is to collect data for medium or long term monitoring and performance analysis and thus relatively low update rates may be acceptable. However there are some applications where timing is critical to safety. For example in a network of gas sensors for detecting abnormally high levels of a dangerous gas, it may be critical that any such elevated levels are reported as quickly as possible. This can be achieved by using a high update rate but this comes at the cost of a significant increase in power consumption and therefore consequent reduction in battery life or increase in cost and weight.

SUMMARY OF THE INVENTION

The present invention seeks to address this problem and when viewed from a first aspect provides a wireless sensor network comprising at least one sensor unit comprising a sensor for sensing a parameter and at least one interrogating node, wherein the interrogating node is arranged to transmit an interrogation message periodically to said sensor unit and to receive a reply message from said sensor unit, wherein the sensor unit is arranged to transmit said reply message after a predetermined deliberate delay unless the sensor unit determines that an alarm condition has been met, in which case the sensor unit is arranged to transmit said reply message before the end of the deliberate delay.

Thus it will be seen by those skilled in the art that in accordance with the invention, a remote sensor may have a relatively low update rate (derived from the deliberate delay in responding to the interrogation message) under normal circumstances but it is nonetheless able to report more quickly in the event of an alarm condition being met. This gives the benefit of longer battery life for a remote sensor unit whilst retaining its ability to be used in safety-critical systems. The feature of deliberately delaying the reply under normal conditions but sending it sooner under an alarm condition is advantageous as it enables the sensor unit to have control over when the reply is sent but is compatible with protocols where a remote sensor unit can only respond to interrogation messages; i.e. it cannot initiate a communication.

As used herein the term 'deliberate delay' is intended to indicate a delay which is longer than that which is inevitable in the system due to processing delays, clock latency etc.

It will be appreciated that the invention extends to the sensor units of such a network in their own right and thus when viewed from another aspect the invention provides a sensor unit for a wireless sensor network, wherein the sensor unit comprises a sensor for sensing a parameter and is arranged to receive an interrogation message periodically from an interrogating node and to transmit a reply to said interrogating node after a predetermined deliberate delay unless the sensor unit determines that an alarm condition has been met, in which case the sensor unit is arranged to transmit said reply before the end of the deliberate delay.

The invention also extends to a method of operating a wireless sensor network comprising at least one sensor unit and at least one interrogating node, the method comprising: the interrogating node periodically transmitting an interrogation message to said sensor unit; and the sensor unit transmitting a reply to the interrogating node after a predetermined deliberate delay unless the sensor unit determines that an alarm condition has been met, in which case the sensor unit transmits said reply before the end of the deliberate delay.

The interrogating node could generate the interrogation messages itself. In a set of preferred embodiments however the interrogating node is arranged to pass on interrogation messages generated by another device—e.g. a controller connected to a common network with the interrogating device.

The alarm condition could take a number of forms. In a set of preferred embodiments it comprises a threshold for a sensed parameter. In the example of a gas sensor, the alarm condition could comprise a threshold concentration, such that the alarm condition is satisfied if any concentration above the threshold is detected. However there are many other possibilities such as a lower threshold for a parameter (e.g. oxygen concentration) or an acceptable band (e.g. for temperature) and alarm conditions could be composite—i.e. based on more than one parameter. Additionally or alternatively the alarm condition could have a time component—for example the alarm condition could comprise the rate of change of a parameter, the average value, the breaching of a threshold for a predetermined amount of time or any combination of these.

The sensor unit may have more than one alarm condition—either based on the same parameter(s) or on different parameters—e.g. where the sensor unit comprises multiple detectors.

The reply message may take many different forms. It could conceivably be the same under normal conditions and under the alarm condition, with the interrogating node merely taking note of the timing of the reply to determine whether the alarm condition is present, although this would not be appropriate for safety-critical applications. In a preferred set of embodiments the reply message comprises a different, alarm message if an alarm condition is detected, to ensure reliable and rapid interpretation of the alarm message and appropriate action by the network—e.g. in generating an alarm. The alarm message could comprise a single flag or a multi-valued status code—e.g. where the sensor unit has multiple alarm conditions.

The reply message may comprise quantitative data related to the parameter(s) sensed by the sensor unit. Such quantitative data may form part of the reply message under normal conditions, under all conditions or only under alarm conditions. The data supplied under the alarm condition may be related to the parameter defining the alarm condition but this is not essential. For example if the alarm condition is an excessive concentration of a gas, an alarm message might include data on the actual concentration detected.

A single alarm message is transmitted in accordance with the invention upon an alarm condition being detected. Preferably however a message is sent repeatedly, preferably more often than a normal reply message. This ensures that the alarm message is ultimately received and acted upon even if one or more packets is lost during transmission. It is also advantageous where the alarm message comprises quantitative data as it allows the data to be frequently updated and thus allows a user or monitoring software to keep track of the development of a problem. Messages sent by the sensor unit which are additional to reply messages— i.e. which are not in direct reply to a request message—are treated as unsolicited messages in some protocols and may thus stand a lower chance of being received and processed by the interrogating node/controller, but nonetheless it is considered beneficial to transmit them.

In a set of preferred embodiments the reply message includes identification information for identifying the sensor unit. However this is not essential. The application may simply require that the network is made aware of an alarm condition taking place at any point in the network—e.g. to allow corrective application to be taken such as shutting down a system. Alternatively, particularly in systems which are not safety-critical, the interrogating node may be able to infer the identity of the sensor unit sending the reply: for example because each sensor unit is associated with a particular channel (by time, frequency or code division); or from the network being configured so that sensor units only respond to interrogating messages specifically directed to them. Although in preferred embodiments the or each interrogating node communicates with a plurality of sensor units this is not essential; it or they may communicate with just one sensor unit.

Preferably one or more sensor units is arranged to relay messages and/or data for other sensor units or network nodes. This would allow a hierarchical network in which some sensor units are able to act as intermediate nodes for others. This would mean that reply messages from some sensor units follow multi-hop paths.

As a corollary to this the interrogating node may comprise a sensor for sensing a parameter such that the interrogating node can itself detect and report an alarm condition without having to communicate with a further interrogating node.

Preferably the sensor unit is battery powered. This allows a high degree of flexibility in where it is placed. It need not be powered exclusively by one or more batteries; it may also comprise solar cells or other energy harvesting sources to extend battery life. Multiple sensor units could share a power source.

In a set of embodiments a sensor network in accordance with the invention comprises a plurality of interrogating nodes connected together and/or to a central server by means of a data network. A conventional wired or wireless data network could be employed—e.g. Ethernet, WiFi, TCP/IP etc. In a set of embodiments PROFINET and PROFISAFE are employed.

The interrogating node(s) may be powered by mains power to facilitate this. A central server could comprise an interrogating node integrated therewith.

In accordance with the invention the sensor unit is arranged to send a reply (e.g. an alarm message) if an alarm condition is detected sooner that it would otherwise have sent it. This could still allow for a deliberate delay, but preferably the sensor unit is arranged to transmit said reply message as soon as possible after an alarm condition is detected.

The deliberate delay in the sensor unit is preferably arranged so that the reply to the interrogation message is sent shortly before the next interrogation message is received— in other words the deliberate delay is as long as possible without overlapping the next message. This maximises the advantage achievable in accordance with the invention of being able to send an alarm message as the reply as quickly as possible if an alarm condition is detected. It also advantageously allows the sensor unit to go into a sleep state between reception of the interrogating message and transmission of the reply so that it only has to wake up once each cycle. In the sleep state the sensor unit need only monitor for the alarm condition and carry out any other essential functions but can switch off the circuitry related to the transmitter and receiver.

In one set of embodiments where the interrogation messages are transmitted with a period T, the deliberate delay is more than 80% of T. In other words unless an alarm condition is detected, the reply message is sent within the last 20% of the period after the interrogation message is received.

The wireless sensor unit is preferably arranged to communicate with the interrogating node by radio frequency signals, although other types of signals may be possible in some embodiments for communication in one or both directions—e.g. ultrasound, infrared etc.

In one set of embodiments the interrogating node is controlled (internally or by an external controller) to send request messages more frequently in the event of an alarm message being received. Preferably the interrogating node is caused to send a control message to the sensor unit in this case to cause the sensor unit to reduce the deliberate delay accordingly. This ensures that the sensor unit can send reply messages (i.e. those which should be guaranteed by the protocol to be received) more frequently. Additionally or alternatively, in the event of an alarm message being received, the sensor unit could transmit additional, unsolicited messages which are not reply messages and thus not guaranteed to be received by the interrogating node or processed by the node or controller.

Any increase in the rate at which request messages are sent could, for example, be for a certain amount of time only or until an alarm condition is no longer present, The sensor network could be based on any of a number of different protocols such as wireless HART (Highway Addressable Remote Transducer) but in a set of embodiments it is based on ISA100 standard set by the International Society of Automation.

The parameter sensed by the sensor unit could be any of a number of different possibilities depending on the application. In a set of embodiments the sensor unit comprises a gas sensor.

BRIEF DESCRIPTION

A preferred embodiment of the invention will now be described, by way of example only, with reference to the accompanying drawings in which.

DETAILED DESCRIPTION

Figure 1:
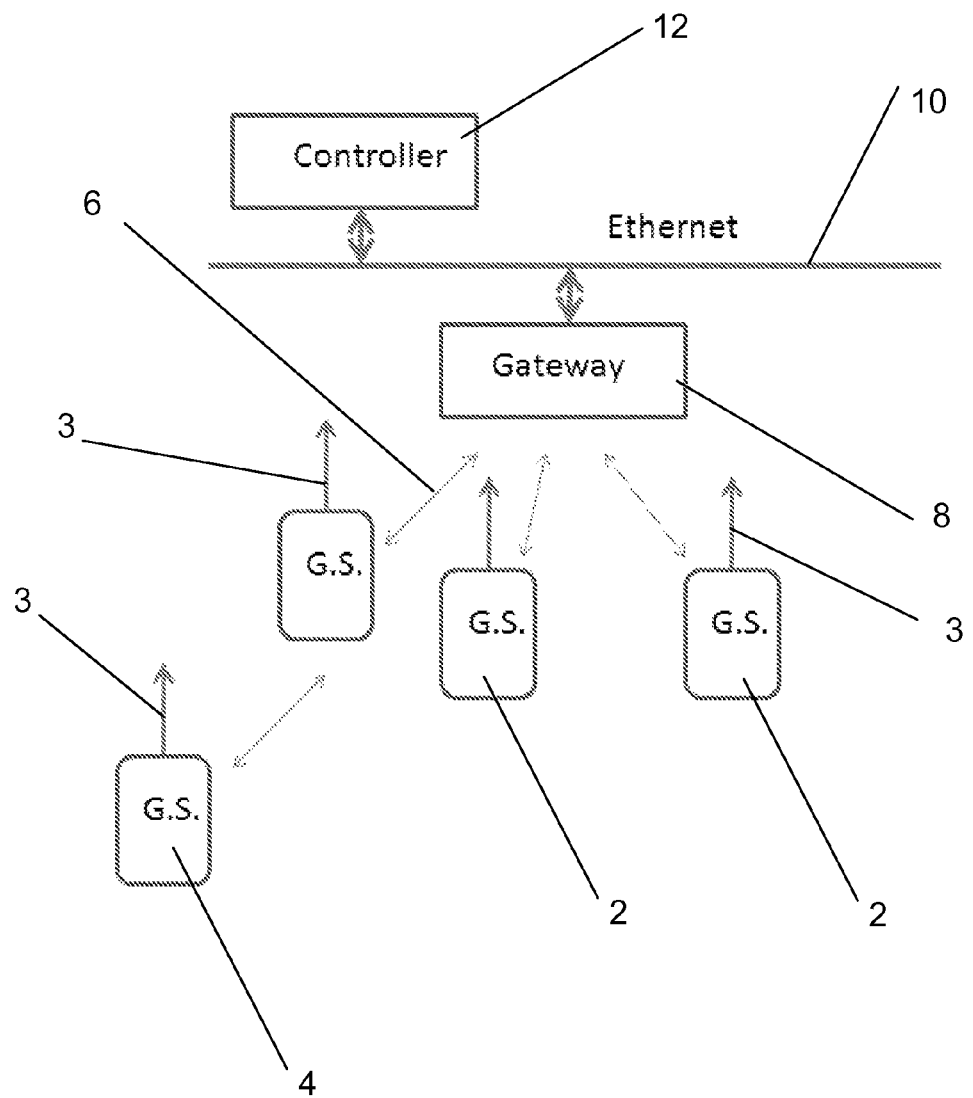
FIG. 1 is a schematic representation of a sensor network embodying the invention.

Referring first to FIG. 1, there can be seen a network of hydrocarbon gas sensor units 2, 4. Each of the sensor units 2, 4 comprises a gas detector and a 2.4 GHz radio transmitter and receiver which are designed to operate the ISA100.11a or Wireless HART communication protocol, connected to an antenna 3. Of course these particular details are merely illustrative and other sensors and/or communication methods could be used instead.

Some of the sensor units 2 have a direct two-way radio link 6 with a gateway or proxy 8 which acts as an interrogating node as will be described in more detail hereinbelow. The remaining units 4 have radio links with other units 2 enabling multi-hop communication between the remote sensor unit 4 and the gateway 8. In this case the sensor units 2 with a direct link act as intermediate nodes. The sensor units may all be identical and configurable as intermediate or not, as required. Alternatively some may be capable of acting only as remote nodes. Other topologies and hierarchies are possible and so there may be two or more hops in the path from a given sensor unit back to the main network.

The gateway 8 is connected to an Ethernet network 10, as is a controller 12 which controls the operation of the system. This operation will now be described with reference to FIGS. 2 and 3.

Figure 2:
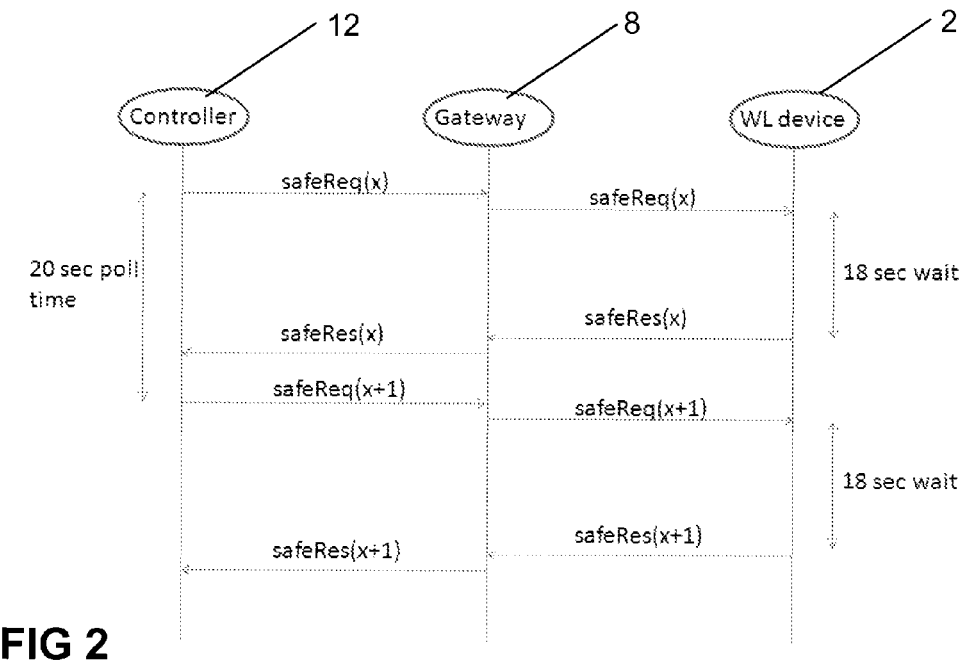
FIG. 2 is a communication timing diagram relating to normal operation.

Under normal operation, as can be seen from FIG. 2, the gateway 8 is ordered by the controller 12 to transmit an interrogation message comprising a downlink message safeReq(x) to a given sensor unit 2 every twenty seconds requesting confirmation of safe conditions at that sensor unit. The sensor unit 2 receives the safeReq(x) message, and goes to sleep for eighteen seconds whereby the radio transceiver circuitry and all other non-essential subsystems are powered down. After eighteen seconds the sensor unit then wakes up to construct and transmit a response packet safeRes(x) based on the last received message safeReq(x). The response packet safeRes(x) is received by the gateway 8 and passed on to the controller 12. Shortly after this the controller 12 initiates the next message safeReq(x+1) and the process is repeated. The sensor unit thus performs one receive and one transmit every twenty seconds.

Figure 3:
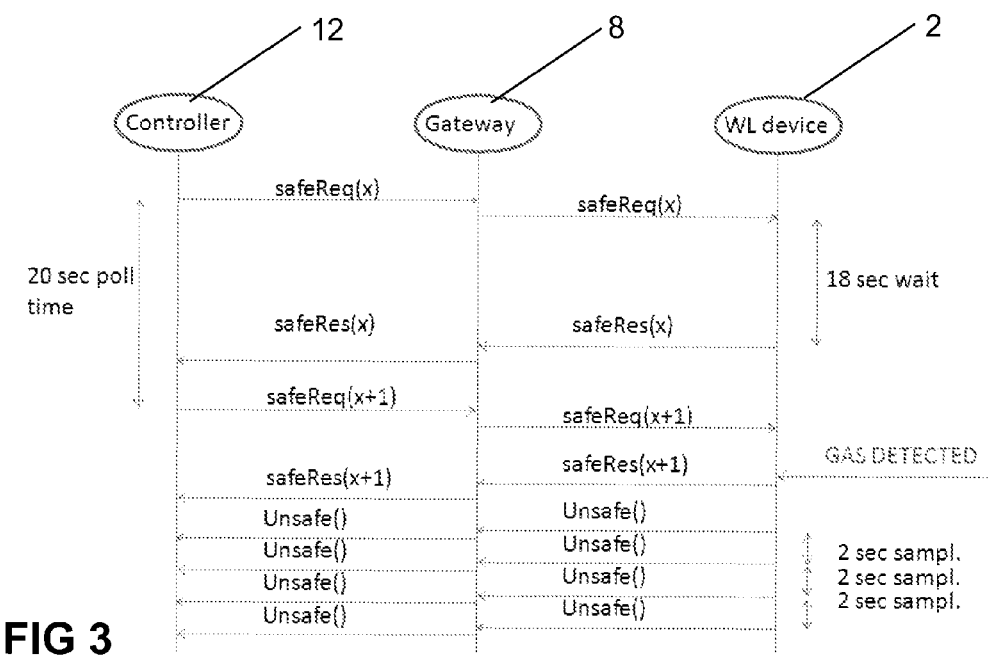
FIG. 3 is a communication timing diagram relating to an alarm condition operation

Operation under an alarm condition is shown in FIG. 3. In this diagram the first interrogation messages safeReq(x) is transmitted by the controller 12 via the gateway 8 and the corresponding reply safeRes(x) is received just over eighteen seconds later. The next interrogation message safeReq(x+1) is then transmitted but instead of the sensor unit 2 staying in its sleep state for the subsequent eighteen seconds, it is woken up by its gas detector detecting a concentration of hydrocarbon gas in excess of a predetermined threshold which constitutes an alarm condition (other alarm conditions are also possible). Within the next two seconds the sensor unit 2 transmits the reply to the safeReq(x+1) interrogation message in the form of an alarm message safeRes(x+1). It will be appreciated that the reply is being sent earlier than would have been the case. It will also contain different information including a flag to designate it as an alarm message. The alarm message safeRes(x+1) is passed to the controller 12 which can take appropriate action such as sounding an alarm, shutting off a safety valve etc. After transmitting the solicited SafeRes(x+1) message, the sensor unit 2 continues to send unsolicited messages—Unsafe( ) which include data representing the actual measurement of concentration by the detector. The Unsafe( ) message is repeated every two seconds to give very up-to-date information on the concentration of gas, until the sensor unit 2 is reset. When the next interrogation message safeReq(x+2) (not shown) is transmitted, assuming the alarm condition still persists, the sensor unit will respond as before with a 'safe'—i.e. solicited—reply message safeRes(x+2) followed by a series of Unsafe( ) messages. This continues until the controller 12 instructs the gateway 8 to send a reset message to the sensor unit 2, It can be seen therefore that in normal use there is only one receive and one transmit in a twenty second period (with in fact the transmit of the previous reply taking place immediately before receiving the next message), meaning that the sensor unit can spend most of its time in sleep mode and thus have very low power consumption. However in the event of an alarm condition it can transmit an alarm message within two seconds. Since this acts as a reply to the polling/interrogation message, the gateway 8 is able to receive and process it immediately. The wireless communication is therefore effectively set up with a asymmetric bandwidth allocation: once every twenty seconds for the down-link but up to once every two seconds for the up-link. This arrangement allows the detectors to be certified to the SIL2 standard whilst maintaining very long battery life. The communication between the sensor units and the interrogating node is also arranged to include timeout, sensor identification and data consistency checks—all know per se in the art—to ensure compliance with the SIL2 safety standard.

The polling period of twenty seconds is set so that two consecutive packets could get lost within a process safety time of sixty seconds without disabling the functionality of the sensor unit.

The invention claimed is:

1. A wireless sensor network comprising:
   at least one sensor unit comprising a sensor for sensing an environmental parameter and at least one interrogating node, wherein the interrogating node is arranged to transmit an interrogation message periodically to said sensor unit and to receive a reply message from said sensor unit in response to said interrogation message, wherein the sensor unit is arranged to determine whether an alarm condition has been met and, conditional on the sensor unit determining that the alarm condition has not been met, to transmit said reply message after a predetermined deliberate delay and before a subsequent interrogation message is received by the sensor unit; and otherwise, if the sensor unit determines that the alarm condition has been met, to transmit said reply message before the deliberate delay ends.

2. The network of claim 1, wherein the interrogating node is arranged to pass on interrogation messages generated by another device.

3. The network of claim 1, wherein the reply message comprises a different, alarm message if an alarm condition is detected.

4. The network of claim 1, wherein the reply message comprises quantitative data related to a parameter sensed by the sensor unit.

5. The network of claim 1, wherein the sensor unit is arranged to send a message repeatedly, more often than a normal reply message, if an alarm condition is detected.

6. The network of claim 1, wherein the reply message includes identification information for identifying the sensor unit.

7. The network of claim 1, wherein the interrogating node communicates with a plurality of sensor units.

8. The network of claim 1, wherein one or more sensor units is arranged to relay messages and/or data for other sensor units or network nodes.

9. The network of claim 1, comprising a plurality of interrogating nodes connected together and/or to a central server by a data network.

10. The network of claim 1, wherein the sensor unit is arranged to transmit said reply message as soon as possible after an alarm condition is detected.

11. The network of claim 1, wherein the deliberate delay in the sensor unit is arranged so that the reply to the interrogation message is sent shortly before the next interrogation message is received.

12. The network of claim 1, wherein the interrogation messages are transmitted with a period T and the deliberate delay is more than 80% of T.

13. The network of claim 1, wherein the interrogating node is controlled to send request messages more frequently in the event of an alarm message being received.

14. The network of claim 13, wherein the interrogating node is caused to send a control message to the sensor unit to cause the sensor unit to reduce the deliberate delay accordingly.

15. The network of claim 1, wherein the sensor unit comprises a gas sensor.

16. A sensor unit for a wireless sensor network, wherein the sensor unit comprises:

a sensor for sensing an environmental parameter, and the sensor unit is arranged to receive an interrogation message periodically from an interrogating node and to transmit a reply to said interrogating node in response to said interrogation message, wherein said sensor unit is further arranged to determine whether an alarm condition has been met and, conditional on the sensor unit determining that the alarm condition has not been met, to transmit said reply message after a predetermined deliberate delay and before a subsequent interrogation message is received by the sensor unit; and otherwise, if the sensor unit determines that the alarm condition has been met, to transmit said reply before the deliberate delay ends.

17. The sensor unit of claim 16, wherein the reply message comprises a different, alarm message if an alarm condition is detected.

18. The sensor unit of claim 16, wherein the reply message comprises quantitative data related to a parameter sensed by the sensor unit.

19. The sensor unit of claim 16, arranged to send a message repeatedly, more often than a normal reply message, if an alarm condition is detected.

20. The sensor unit of claim 16, wherein the reply message includes identification information for identifying the sensor unit.

21. The sensor unit of claim 16, arranged to relay messages and/or data for other sensor units or network nodes.

22. The sensor unit of claim 16, wherein the sensor unit is arranged to transmit said reply message as soon as possible after an alarm condition is detected.

23. The sensor unit of claim 16, wherein the deliberate delay is arranged so that the reply to the interrogation message is sent shortly before the next interrogation message is received.

24. The sensor unit of claim 16, wherein the deliberate delay is more than 80% of T, where T is the period between receipt of the interrogation messages.

25. The sensor unit of claim 16, comprising a gas sensor.

* * * * *